3,188,353
METHOD OF PREPARING POLYETHERS
Hans Holtschmidt, Cologne-Stammheim, Germany, assignor to Farbenfabriken Bayer Aktiengesellschaft, Leverkusen, Germany, a corporation of Germany
No Drawing. Filed Aug. 29, 1961, Ser. No. 134,595
Claims priority, application Germany, Sept. 17, 1960, F 32,149
3 Claims. (Cl. 260—615)

This invention relates to polyethers and a method of preparing the same. More particularly, it relates to a method of preparing polyalkylene ethers having at least six carbon atoms between ether linkages.

The production of polyglycol ethers containing hydroxyl groups is described in numerous publications for these ethers are resistant to hydrolysis and are valuable components useful in the preparation of plastics, including polyurethanes by the isocyanate polyaddition process. It has been heretofore known to produce polyethers and particularly polyglycol ethers by the polymerization of suitable cyclic ethers such as tetrahydrofuran, ethylene oxide and propylene oxide.

It has also been known that in some cases polyhydric polyalkylene ethers can be produced by the condensation of polyhydroxyl terminated compounds such as glycols and triols where the hydroxyl groups are activated for example in the case of glycols, by having a thioether group in the beta position to the hydroxyl group or by having the hydroxyl group in the alkyl position to an unsaturated aliphatic or aromatic carbon-carbon bond such as, for example, that found in xylylene glycol.

It has not, however, been possible to convert simple glycols having no activated hydroxyl groups into linear polyalkylene ethers by splitting out water. When attempts have been made to condense glycols, for example, having no activated hydroxyl groups, the cyclic ethers were formed rather than linear polyethers.

It is, therefore, an object of this invention to provide a method of preparing polyhydric polyalkylene ethers. It is another object of this invention to provide a simplified method of preparing polyhydric polyalkylene ethers from suitable polyhydroxy compounds as starting materials. It is still another object of this invention to provide polyhydric polyalkylene ethers by condensation reactions starting with suitable polyhydroxy compounds.

The foregoing objects and others are accomplished in accordance with this invention by providing a method for preparing polyhydric polyalkylene ethers in high yield by heating polyhydroxy compounds in which the hydroxyl groups are joined by a carbon chain of at least six carbon atoms to a temperature of from about 120° C. to about 250° C. in the presence of an etherification catalyst. Thus, the invention contemplates heating within the above said temperature range, an organic compound containing at least two primary hydroxyl groups in the presence of an etherification catalyst wherein the organic compound containing the hydroxyl groups has at least six carbon atoms of an aliphatic chain between the hydroxyl groups.

Any suitable compound having at least six carbon atoms between the primary hydroxyl groups may be used in the process of this invention to produce polyhydric polyalkylene ethers such as, for example, 1,6-hexanediol, 1,7-heptanediol, 1,8-octanediol, 1,9-nonanediol, 1,10-decanediol, 1,12-octadecanediol, octadecen-9,10-diol-1,12, hexahydroxylylene glycol and the like. Aliphatic diols are preferred. Other polyhydroxy compounds containing less than six carbon atoms when condensed in this manner alone, give poor yields of polyalkylene ethers for the reasons stated above, that being the production predominantly of cyclic ethers. In order, however, to reduce the crystallization of the product, it may be in some instances desirable to employ compounds having less than six carbon atoms between primary hydroxyl groups in a minor amount during the etherification action at the expense of the yield. Suitable polyhydroxyl compounds for this purpose include, such as, for example, triethylene glycol, butane-1,4-bis-β-hydroxyethylether, hexanediol-1,6-β-hydroxyethylether and the like.

In accordance with this invention, it is also possible to prepare branched polyethers by the use of polyalcohols having more than two primary hydroxyl groups such as, for example, trimethylol propane, pentaerythritol glycerine, mannitol, and the like. There is of course no lower limit for the amount of these higher functional compounds to be used. As a general upper limit, however, no more than 20% by weight of the higher functional compound should be used based on the amount of diol reaction compounds. Best results are obtained in the manufacture of branched polyethers by employing 1 to 10% by weight of trihydric alcohols.

In the practice of the method in accordance with this invention the polyhydric polyalkylene ethers are prepared by heating a suitable polyhydroxyl compound having at least six carbon atoms in the chain between the hydroxyl groups at a temperature of from about 125° C. to about 250° C. and preferably from about 160° C. to about 200° C. in the presence of a catalytic amount of an aliphatic catalyst. Preferably, the etherification catalyst should be present in an amount of from about 0.05 to about 5 percent by weight. Any suitable etherification catalyst may be used such as, for example, p-tolylene sulfonic acid, naphthalene sulfonic acid, phosphoric acid, sulphanilic acid, acid earths, sulfuric acid, potassium disulfate, potassium pyrosulfate, naphthalene disulfonic acid, benzene disulfonic acid, and the like. It is preferred that the polyfunctional etherification catalysts such as the disulfonic acids, phosphoric acid and the like be used, as these catalysts do not cause a breaking of the chain due to esterification of the hydroxy groups, thus resulting in a disappearance of the terminal hydroxyl groups, which occurs somewhat when monofunctional etherification catalysts such as p-tolylene sulfonic acid, naphthalene sulfonic acid or benzene sulfonic acid are used. The mixture of polyhydroxyl compound and catalyst is continued until the calculated quantity of water which will result in a polyhydric polyalkylene ether having the desired hydroxyl number has been split off. That is, the hydroxyl number of the resulting polymer is determined by measuring the quantity of water produced in the condensation reaction. The last stage of condensation may be carried out under vacuum. When a light colored product is desired, it is advisable to conduct the condensation in an inert gas atmosphere for example under nitrogen or carbon dioxide.

Where it is desired to utilize the polyethers prepared in accordance with this invention in the production of polyurethane plastics, it is particularly important that terminal hydroxyl groups are disposed at the end of each molecule for the reason that it is necessary that the molecules have at least two terminal groups capable of reacting with isocyanate groups to prepare isocyanate polyaddition products having suitable properties. If, for example, only one hydroxyl group is present, chain termination results by reaction with an isocyanate, thus preventing the preparation of the higher molecular weight polymers necessary to impart good mechanical properties to the products.

In the preparation of the polyalkylene ethers in accordance with this invention, a side reaction occasionally occurs resulting in an ethylenically unsaturated group occurring at the end of the chain with the loss of hydroxyl groups by the intramolecular splitting off of water, especially when relatively large quantities (more than 1 percent) of etherification catalysts or glycols having secondary or tertiary hydroxyl groups are used. This mechanism is similar to that which occurs when olefines result as by-products in the production of low molecular weight ethers. It can thus be seen that if ethylenically unsaturated groups occur at the end of the chain with the loss of an hydroxyl group for each unsaturated group formed, the resulting polyether will not be suitable in the reaction with an isocyanate to produce a suitable polyurethane. Although this side reaction does not occur to a great extent and is not detrimental in all utilities for the polyethers in accordance with this invention, it is desirable to achieve an hydroxyl group in the place of the ethylenically unsaturated groups when the ultimate goal for the polyether formed is in the manufacture of polyurethanes.

The unsaturated groups may be replaced in the molecule by treating the polyglycol ethers with an hydroxymercaptan. The mercaptan group will add to the double bond resulting in the polyether chain having an hydroxyl termination. Any suitable mercaptan containing compound having hydroxyl groups may be used for the purpose such as, mercapto-ethanol, mercapto-propanol, 1-mercapto-4-hydroxy butane and the like. Any other suitable means for converting any ethylenically unsaturated groups present may be used such as, for example, epoxidation or ozonisation with the subsequent splitting of the resulting epoxide or ozonide with the addition of hypochlorous acid.

After the condensation is carried out to the desired hydroxyl number, which is determined, as stated above, by measuring the amount of water given off from the reaction, the catalyst is removed from the reactive composition, for example, by treating the reaction composition with ammonia under pressure or with a sufficient quantity of a base to neutralize the catalyst. Any suitable base may be used such as, for example, alkaline metal and alkaline earth metal compounds such as, for example, sodium hydroxide, and the like.

The polyglycol ethers produced by the process of this invention have a molecular weight of from about 600 to about 10,000 and in some cases, even higher. As stated previously, these compounds are useful in the preparation of polyurethanes by reaction with organic polyisocyanates. Polyurethane plastics, of course, are useful in preparing products such as mattresses, pillows, cushions, both heat and sound insulating barriers, heels and soles for shoes, gears, rubber tires, shock absorbing articles and the like.

The invention is further illustrated by the following examples in which parts are by weight unless otherwise specified.

Example 1

About 0.3 percent of naphthalene-1,5-disulfonic acid are added to about 1180 parts of 1,6-hexanediol. The resulting mixture is heated to 180 to 190° C. while passing $CO_2$ therethrough. $H_2O$ is split off violently and a small quantity of a water-insoluble oil simultaneously distills over. A vacuum of about 20 mm. Hg is applied after about 150 cc. of $H_2O$ have been split off (i.e. after about 7 to 8 hours). After further condensation for about 12 hours under vacuum at 180 to 190° C., an OH number of about 56 is reached. Yield: 870 parts=87 percent of the theoretical.

The polyhexanediol thus obtained is a light-colored solid having a softening point of 50° C. to 65° C. Water vapor and $NH_3$ gas are simultaneously blown into the melt of the polycondensate at 100° C. in order to remove the catalyst. The melt is then dehydrated and the product is filtered off from the precipitated ammonium salts.

Example 2

About 1180 parts of hexanediol are condensed with about 0.1 percent of m-benzene disulphonic acid as described in Example 1. If the polycondensation is broken off when an OH number of 100 has been reached, the yield is 900 g.=90 percent of the theoretical.

Example 3

A mixture of about 1180 parts of hexanediol and about 134 parts of trimethylol propane is condensed in the presence of about 0.3 percent of naphthalene disulfonic acid as described in Example 1. The resulting branched polyether is a thickly liquid, light colored oil, having an OH number of 320. The yield is 88 percent of the theoretical.

Example 4

About 1500 parts of 1,6-hexanediol and about 1500 parts of triethylene glycol are condensed in the presence of about 0.5 percent of naphthalene disulfonic acid as described in Example 1 until an OH number of 62 is reached. Yield: 2120 g. The product is a light yellow oil which can be emulsified in water.

Example 5

About 1740 parts of 1,10-decane-ethylene glycol are condensed with about 0.3 percent of naphthalene disulfonic acid as described in Example 1. The resulting polycondensate has an OH number of 61. The yield is 92 percent of the theoretical.

The invention, of course, is not limited by the working examples which are illustrative. Any of the components set forth above may be used in place of the particular components used in the working examples, that is, any of the polyhydroxyl compounds having at least six carbon atoms between the primary hydroxyl groups may be used in place of the particular ones set forth in the examples. Also, any of the catalysts above-mentioned may be used.

Although the invention has been described in considerable detail for the purpose of illustration, it is to be understood that variations can be made by those skilled in the art without departing from the spirit of the invention and scope of the claims.

What is claimed is:

1. In the preparation of a polyhydric polyalkylene ether by a process which comprises heating an aliphatic polyhydric alcohol having at least two primary hydroxyl groups and having at least six carbon atoms in the carbon to carbon chain between said primary hydroxyl groups, in the presence of a sulfonic acid catalyst to a temperature of from about 120° C. to about 250° C. to form said polyhydric polyalkylene ether, the improvement which comprises heating said polyhydric alcohol while mixed with a sulfonic acid selected from the group consisting of naphthalene disulfonic acid and benzene disulfonic acid.

2. The process of claim 1 wherein said sulfonic acid is employed in an amount of from about 0.5 to about 5% by weight.

3. The process of claim 1 wherein said aliphatic polyhydric alcohol is 1,6-hexanediol.

References Cited by the Examiner

UNITED STATES PATENTS 2,492,955   1/50   Ballard et al. _____ 260—615

LEON ZITVER, *Primary Examiner.*

CHARLES B. PARKER, *Examiner.*